United States Patent
Forster

[15] 3,687,212
[45] Aug. 29, 1972

[54] AUTOMOTIVE VEHICLE WITH HYDROSTATIC DRIVE

[72] Inventor: Franz Forster, Aschaffenburg, Germany

[73] Assignee: Linde Aktiengesellschaft, Wiesbaden, Germany

[22] Filed: Oct. 9, 1970

[21] Appl. No.: 79,531

[30] Foreign Application Priority Data
Oct. 10, 1969  Germany..........P 19 51 233.5

[52] U.S. Cl......................180/66 R, 180/75, 180/53
[51] Int. Cl. .............................................B60k 17/10
[58] Field of Search..........180/66, 75; 60/53 R, 53 A

[56] References Cited
UNITED STATES PATENTS

| | | | |
|---|---|---|---|
| 3,104,528 | 9/1963 | Hörig..........................60/53 R |
| 3,142,964 | 8/1964 | Thoma et al...............60/53 A |
| 3,200,593 | 8/1965 | Yoshikazu Kuze...180/66 R X |

*Primary Examiner*—Philip Arnold
*Attorney*—Karl F. Ross

[57] ABSTRACT

The axle housing of the drive wheels of an automotive vehicle having a hydrostatic drive is provided with a drive shaft extending into the axle housing from the engine and a pair of lateral output shafts each of which may be provided with a wheel hub. Within the axle housing, there is provided a hydrostatic pump whose axis extends parallel to the drive shaft and which is driven by a gear transmission from the latter. The hydrostatic pump is hydraulically connected with a hydrostatic motor coupled with an output shaft via a further set of gears, preferably via a differential, the output shaft of the differential being oppositely connected to the wheel hubs by further gearing. The drive shaft is provided with a free end to which power take-off devices may be connected and the drive shaft of the pump likewise may extend from the axle housing to drive auxiliary devices.

10 Claims, 4 Drawing Figures

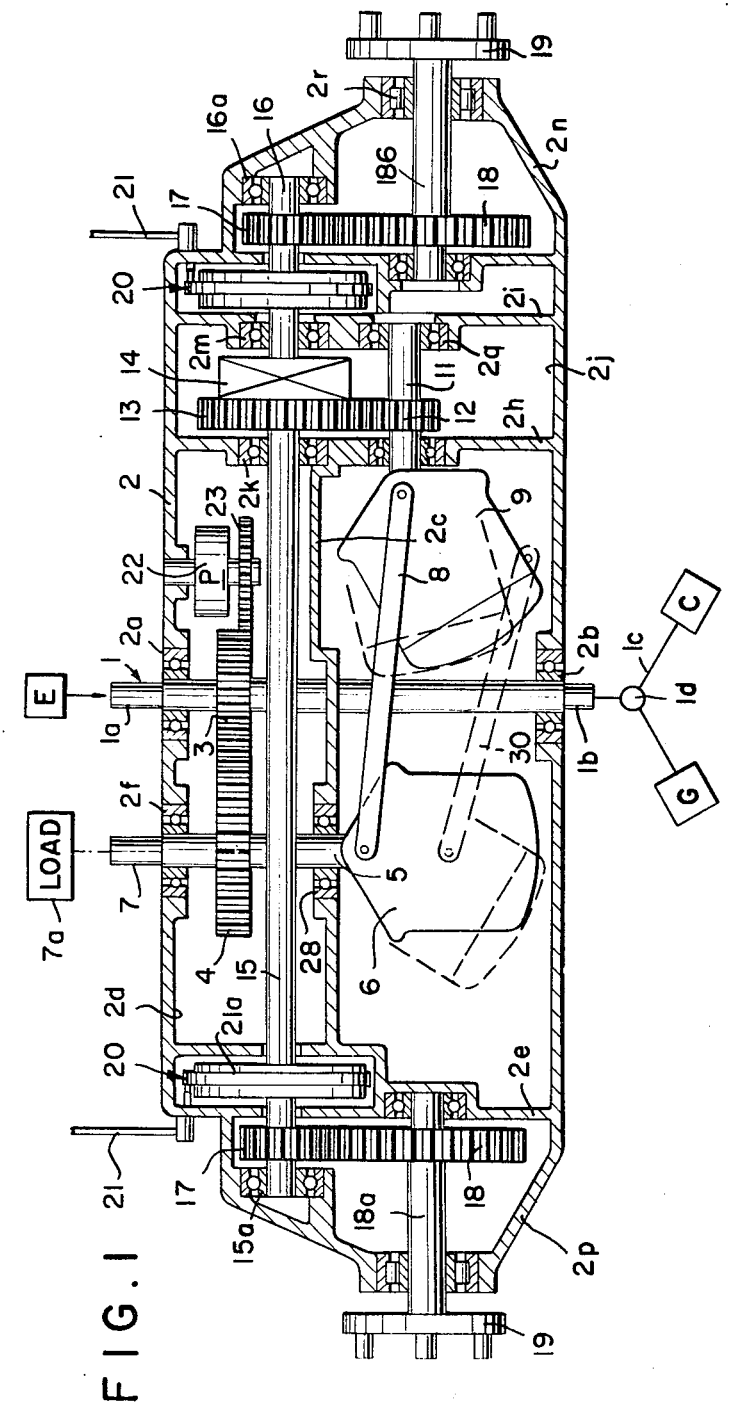
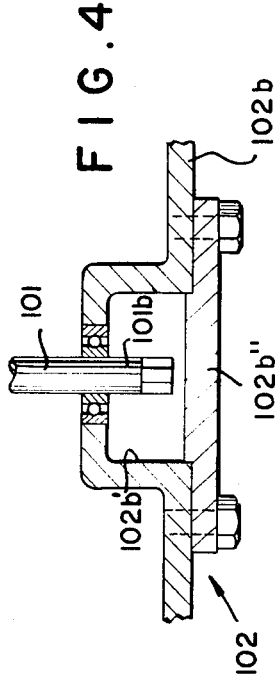

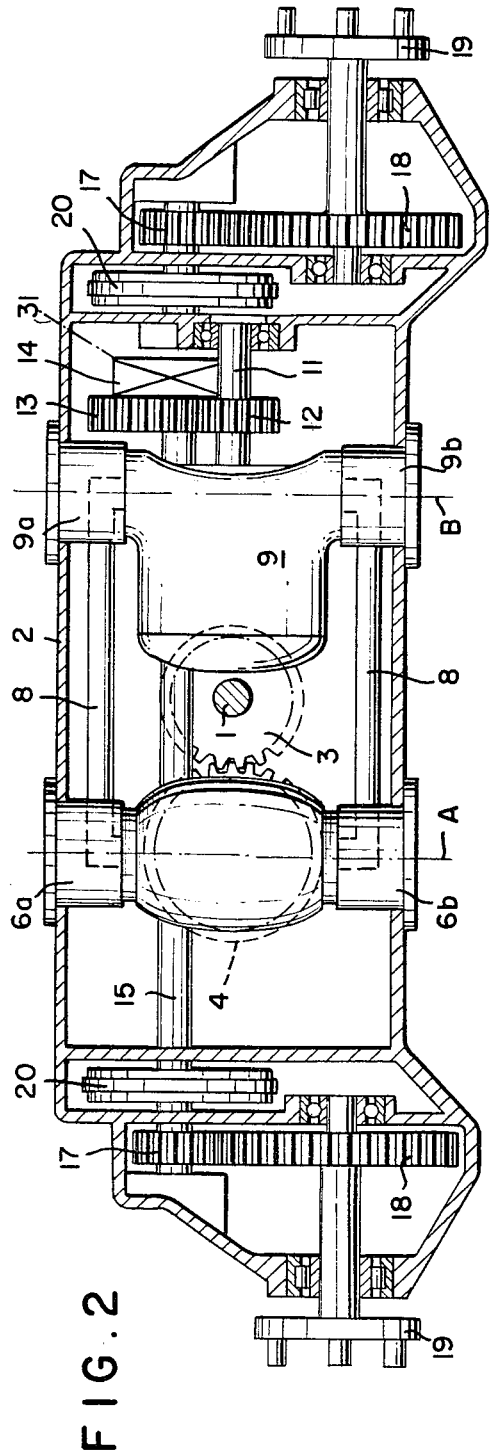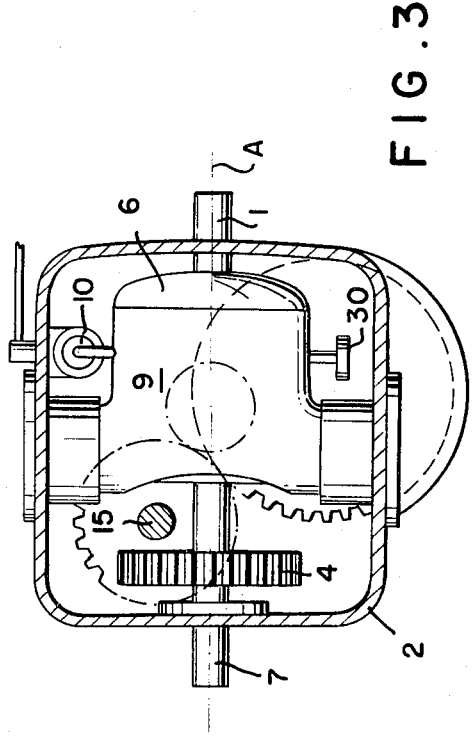
FRANZ FORSTER
*INVENTOR.*
BY Karl J. Ross
ATTORNEY

AUTOMOTIVE VEHICLE WITH HYDROSTATIC DRIVE

FIELD OF THE INVENTION

My present invention relates to an automotive-vehicle drive and, more particularly, to a vehicle drive using a hydrostatic transmission.

BACKGROUND OF THE INVENTION

Hydrostatic transmissions in automotive vehicles have been proposed heretofore by myself and others. For example, it has long been a common practice in the use of hydrostatic pumps and motors, to couple a hydrostatic pump to the output shaft of a vehicle engine, i.e., an internal combustion engine, and to connect this pump via conduits and other hydraulic transmissions to hydrostatic motors provided at each of the driven wheels of the vehicle.

Since either the pump or the motor can be of the variable-stroke, i.e., variable displacement type, it is possible thereby to control the speed of the vehicle and the torque applied to the vehicle wheels.

The term "hydrostatic" is intended here to designate pumping arrangements of the axial-piston type in which a cylinder barrel is rotatable by the input shaft to displace successive pistons and thereby force fluid from the respective cylinder bores through the conduit to the hydrostatic motor. The barrel may be tilted relatively to the input shaft and to a control plate against which the pistons bear to adjust the piston stroke in accordance with the tilt of the pump barrel.

Similarly, the hydrostatic motor may be of the axial-piston type in which the barrel is driven rotatably by the pressurized fluid delivered to a fluid-distribution surface, the the motor torque and speed being a function of the tilt of the barrel relative to a control surface against which the pistons react. The pistons and control surface are rotatably coupled with the output shaft of the motor.

Typical hydrostatic pumps and motors of this type are disclosed in a commonly assigned U.S. Pat. No. 3,299,635. In this patent, there is described a system in which a hydrostatic pump and hydrostatic motor are coupled together in a transmission in a single housing, the transmission having an input shaft extending into the housing and driven by a prime mover externally thereof. The output shaft also extends from the housing and is connected to the hydrostatic motor. Within the housing, the hydrostatic pump and/or the hydrostatic motor may be tilted about respective pivot axis or both may be coupled together for joint displacement as there disclosed. The tilting means may be a servomotor (fluid-responsive cylinder) or a mechanism mechanically capable of shifting one or both of the cylinder barrels about a respective axis perpendicular to the axis of the corresponding shaft. Such transmissions, however, cannot always be satisfactorily used in automotive vehicles because of the configuration of the housing and the low-space availability in most vehicle systems.

There has been suggested a vehicle-power train in which the drive shaft of the vehicle, extending from an internal combustion engine, for example, leads into an axle housing in which a hydrostatic pump is driven by this shaft and, in turn, drives the hydrostatic motor coupled with a pair of output shafts respectively provided with hubs carrying the driving wheels of the vehicle. Between the hydrostatic motor and each of the wheels, there is provided a differential whose housing is driven by the hydrostatic motor. The output shaft of the hydrostatic motor runs parallel to the axis of the wheel shaft. Such devices have also required considerable space and have not been fully applicable to vehicles of many types. Moreover, it is frequently a problem in such vehicles to drive auxiliary equipment, i.e. to provide power take-off arrangements which are accessible and suitable for use, when desired, for the operation of auxiliary devices.

OBJECTS OF THE INVENTION

It is, therefore, the principal object of the present invention to provide an improved hydrostatic drive for automotive vehicles.

Another object of my invention is to provide an improved hydrostatic drive of the character described wherein both the hydrostatic pump and the hydrostatic motor are incorporated in an axle housing of the driving wheels of the vehicle.

It is also an object of the present invention to provide a hydrostatic drive for an automotive vehicle which is highly compact and permits auxiliary equipment to be operated by the motive force within this axle housing.

Still another object of this invention is to improve upon the possibilities of conventional hydrostatic drives so as to permit power take-off at various locations and thereby increase the versatility of such drives.

Still another object of the invention is to provide a more versatile, simple, economical, convenient, compact and efficiently operating hydrostatic drive for the driving wheels of an automotive vehicle.

SUMMARY OF THE INVENTION

The above and other objects, which will be apparent, hereinafter, are attained, in accordance with the present invention, in an automotive-vehicle drive having an axle housing in which a pair of wheel shafts are journaled at opposite axial ends of the housing, the housing being generally elongated and surrounding the axis of the shafts while running generally transversely to the longitudinal axis of the vehicle.

The axle housing is provided with a drive shaft journaled therein and extending parallel to the longitudinal axis of the vehicle and preferably coupled with a prime mover such as the vehicle engine, the drive shaft running horizontally into the housing and being provided therein with a driving gear which forms part of a mechanical transmission operatively connecting same to the drive shaft of a hydrostatic pump provided within the axle housing. The hydrostatic pump has its drive shaft journaled in the axle housing parallel to the input shaft (main power shaft) and generally perpendicular to the wheel axes, the pump being adjustable to vary its fluid displacement, thereby permitting adjustment of the output of the transmission.

The hydrostatic pump is hydraulically connected to a hydrostatic motor forming a hydraulic couple therewith and oriented so that its output shaft lies parallel to the wheel axis and, therefore, perpendicular to the axis of the main input shaft and the drive shaft of the pump, the hydrostatic motor being connected by gearing to the wheel shaft previously mentioned. The hydrostatic motor may also be of the adjustable type and can be provided with means for varying the torque and output speed in accordance with the position of the axial-piston body of this hydrostatic motor. A differential may be interposed between the wheel shaft and the output shaft of the hydrostatic motor.

According to the principles of the present invention, the pump shaft, therefore, is driven by a mechanical transmission from the main input shaft while its drive shaft is provided with means enabling power take-off therefrom, preferably, by extending the pump shaft out of the axle housing. Furthermore, the pump and the motor of the hydrostatic drive or either of them, are adjustable and a servo-mechanism or the like may be provided for this purpose in accordance with the principles set forth in the above identified patent. In a preferred case, the pump and motor are shiftable conjointly about respective pivot axis, the pivot axes being parallel to each other and perpendicular to, on the one hand, the drive shaft of the hydrostatic pump and, on the other hand, the output shaft of the hydrostatic motor. Hence, the pivot axis may also be perpendicular to the main input shaft and to the wheel axis mentioned earlier. Finally, an important aspect of the combination is the provision of further transmission means (output transmissions) between the output shaft of the differential and the wheel shaft which are journaled in the axle housing.

While the versatility of the apparatus will be immediately be apparent, it is important to note that the preliminary mechanical transmission, advantageously a set of meshing gears between the main drive shaft and the pump-drive shaft, and the after-transmission in the form of meshing gears between the output shaft of the differential and the wheel shaft, permit the hydrostatic drive to operate at optimum angular velocity independently of the required output velocity and the velocity of the main drive shaft. This has long been a problem in hydrostatic drives adapted for automotive vehicle use.

Frequently the angular velocity of the main drive shaft, which may be coupled to the crank shaft of an internal-combustion engine, is excessive for efficient operation of a hydrostatic pump while the output of a hydrostatic motor is of an excessively high velocity when compared to the angular velocity desired at the wheel shafts. Hence it is desirable to operate the hydrostatic pump at a lower angular velocity than that which is possible with the output of an internal-combustion engine while direct drive of the vehicle wheels renders it uneconomical for many hydrostatic motors. The system according to the present invention permits the hydrostatic drive couple, i.e. the combination of hydrostatic pump and hydrostatic motor to operate at the optimum angular velocities while nevertheless providing the desired output angular velocity at the wheel shaft, and accommodating the drive to the high speed of an internal-combustion engine.

Another important advantage of the present invention, directly related to the use of the preliminary transmission and the aftertransmission mentioned above in conjunction with infinitely adjustable hydrostatic devices, i.e. hydrostatic pump and hydrostatic motors, is the fact that the axle assembly can be accommodated to vehicles of various types and for various purposes and yet provide a wide range of transmission ratios in terms of the ratio of input torque to output torque or input speed to output speed. The term "input torque" is used herein to refer to the available torque at the main power shaft while the term "input speed" designates the angular velocity of this input shaft. As a corollary, the term "output torque" refers to the torque at the drive shaft, i.e. at the wheel-carrying hub of the system, while the output velocity is, of course, the wheel velocity. Furthermore, the availability of power take-off at the drive shaft of the pump affords greater versatility of the system since the pump shaft is operated at a velocity other than that of the main drive shaft by virtue of the step-down transmission provided between the main drive shaft shaft and the pump drive and described earlier.

According to another feature of this invention, the main drive shaft is provided with a free end, i.e. an end beyond the pretransmission which is designed to accommodate auxiliary equipment which may be removably coupled therewith. While this free end of the shaft may extend out of the axle housing whereby the shaft passes through the axle housing, the projecting extremity serving to drive a generator or auxiliary device necessary in the operation of the vehicle or for the operation of other equipment when the vehicle is stationary or coupled to such equipment, it is possible to provide coupling means at the free end within the axle housing while providing an opening in the latter through which the mating coupling may be inserted, whereby the opening may be closed by a simple coverplate or the like when use of the power take-off possibility of the main drive shaft is not desired. Hence at least two outputs are available from the transmission for the drive of auxiliary equipment.

Still another feature of this invention resides in the provision within the axle housing of means for driving auxiliary devices, e.g. hydraulic pumps, vehicle oil pumps or the like. For example, when the servo-mechanism for displacing the pump or motor barrel is of the fluid-responsive type, an auxiliary pump may be provided in the axle housing and connected to the servo motor by suitable valve means (see the aforementioned patent). Alternatively, the auxiliary pump may be used to circulate hydraulic fluid for power-assist brakes, for hydraulic loads elsewhere on the vehicle (e.g. hydraulic cylinders for lifting), or may operate fluid-displacement pumps for lubrication and the like. The main drive shaft or the pump drive shaft may, according to this invention, be coupled with an electric generator for use in the vehicle, to a compressor for operating pneumatic brakes, or like equipment. The last-mentioned means within the axle housing, for driving an auxiliary pump, may include a gear arrangement coupled with the pretransmission and of a ration designed to suit the auxiliary pump. For example, stepdown gearing may be employed between the drive gear of the main drive shaft or step-up gearing may be used from the driven gear of the pump shaft. Such gearing is, of course, employed when the auxiliary pump is to operate at an angular velocity which is less than the angular velocity of the main drive shaft. Alternatively, step-up gearing may be provided between the gears of the main drive shaft or from the gear of the pump-drive shaft, such gearing being used when the auxiliary pump is operated in an angular velocity in excess of the angular velocity of the main drive shaft.

I have also found it to be advantageous to dispose the differential so that the housing or planetary-gear cage of the latter is driven from the output shaft of the hydrostatic motor via a step-down gearing and to provide, at each of the output shafts of the differential, a locking brake. This brake may serve to lock the vehicle wheels or to brake one of the vehicle wheels and thereby provide torque at the other when the braked wheel otherwise might tend to slip. Advantageously, however, the brakes are employed for locking the vehicle wheel while the differential is of the nonslip type, i.e. is self-blocking to prevent free running of one of the output shafts or can be provided with a differential lock of conventional design, which is either automatic or controlled by the operator of the vehicle, to lock the output shafts of the differential together and thereby drive the wheel shaft without differential action.

DESCRIPTION OF THE DRAWING

The above and other objects, features and advantages of the present invention will become more readily apparent from the following description, reference being made to the accompanying drawing in which:

FIG. 1 is a horizontal section and a plan view of the transmission mechanism according to the present invention, the mechanism being illustrated somewhat diagrammatically;

FIG. 2 is a vertical axial section through the mechanism;

FIG. 3 is a vertical transverse section therethrough; and

FIG. 4 is a detail section of a modification.

SPECIFIC DESCRIPTION

In the drawing, I have shown a hydraulic transmission for an automotive vehicle having a main drive shaft 1 journaled in an axial housing 2, the latter running generally transversely to the longitudinal axis of the vehicle which, in turn, is parallel to the main drive shaft 1. The main drive shaft 1 extends at 1a out of the housing 2 in the forward direction and is there coupled, e.g. by a universal joint, with the crankshaft of an automotive vehicle engine diagrammatically represented at E. Bearings 2a and 2b formed in the front and rear walls of the axle housing 2, respectively, journal the shaft 1 in the housing. The shaft 1, moreover, extends through the housing and has an extremity 1b projecting outwardly from the rear wall of the axle housing, for the drive of auxiliary equipment, e.g. a generator G or a compressor C. The shafts for these auxiliary devices are represented at 1c and are shown to be coupled by suitable means at 1d to the power takeoff end 1b of the main drive shaft.

In FIG. 4, I have shown an alternative arrangement wherein the extremity 1b of the main drive shaft does not extend beyond the rear wall 102b of the axle housing 102, but instead terminates inwardly of this rear wall which is provided with an opening 102b' through which a socket may be inserted over the end 101b to couple a load with the main drive shaft 101. When the load is disconnected and the free end of the main drive shaft 101 is unused, the opening 102b' may be closed by a plate 102b" affixed by suitable bolts.

From FIGS. 1 — 3, moreover, it will be apparent that the main drive shaft 1 traverses a partition 2c separating a forward chamber 2d from an afterchamber 2e. Within the forward chamber 2d, the main drive shaft 1 carries the drive gear 3 of a pretransmission 3, 4, shown to be of the step-down type. The pretransmission 3, 4 also includes a driven gear 4 in mesh with the driving gear 3 and fixed to a pump drive shaft 5. The pump drive shaft 5 is journaled in bearings 2f and 2g of the axle housing for rotation parallel to the shaft 1 and is laterally spaced from the main drive shaft, while having a free end 7 extending from the axle housing. This free end 7 may be provided with key means or the like enabling the connection of a further load 7a to the transmission, the load 7a being driven at the stepped-down angular velocity produced by the pretransmission 3, 4.

Within the chamber 2e, the shaft 5 is connected to the pump generally shown at 6 which is swivelable about an axis A perpendicular to the shaft 5 and, as illustrated in FIGS. 1 and 2, lying in a vertical plane, which also includes the axis of the shaft 5. Various pivotal positions of the pump 6 are shown in broken lines in FIG. 1. The pump 6 is of the axial-piston type, described and illustrated in the commonly owned U.S. Pat. Nos. 3,279,173, 3,299,635, and 3,443,656 or in U.S. Pat. No. 3,163,987. For the most part, the angular offset of the piston body from its solid-line position in FIG. 1 determines the displacement of the fluid and, both the direction of rotation of the motor and the torque delivered to the latter. In the embodiment illustrated here, moreover, an articulated linkage 30 is provided to couple the hydraulic pump 6 with a hydrostatic motor 9 under the control of a servomotor of the fluid-responsive type, best seen at 10. A servomotor and linkage of this kind may be of the type described in U.S. Pat. Nos. 3,299,635 and 3,443,656. To facilitate pivoting movement of the hydrostatic pump 6, the latter is mounted between a pair of trunnions 6a and 6b serving as the fluid supply and outlet for the hydrostatic pump while enabling pivotal movement as described in this latter patent wherein such pivot means is shown in some detail. The fluid inflow and outflow, of course, take place along the axis A.

Ducts 8 conduct the fluid from the hydrostatic pump 6 to the hydrostatic motor 9 which is also of the variable-capacity type and is pivotal about the axis B parallel to the axis A between a pair of pivots 9a and 9b serving also as ports for the hydrostatic motor (see U.S. Pat. No. 3,299,635). The joint displacement of the hydrostatic pump and motor, therefore, determines both the speed ratio and the ratio of torque input to torque output as described in U.S. Pat. Nos. 3,163,987 and 3,443,656.

The output shaft 11 of hydrostatic motor 9 is journaled between a pair of partitions 2h and 2i of the axle housing which define a compartment 2j in which an aftertransmission is provided in the form of a pair of gears 12 and 13. The driving gear 12 of this transmission is mounted upon the output shaft 11 of the hydrostatic motor 9 and meshes with the driven gear 13, the latter being a ring gear formed on the planetary-gear cage or housing of a planetary-gear differential generally illustrated at 14. The differential 14 has a pair of output shafts 15 and 16 which are coaxial and are parallel to the axis of the shaft 11 while extending perpendicularly to the longitudinal axis of the vehicle and, therefore, perpendicularly the shafts 1 and 5. The shafts 15 and 16 are, in turn, journaled in the partitions 2h and 2i by bearings 2k and 2m flanking the differential. Shaft 16 is rotatably supported at its opposite end in a further bearing 16a of a wheel-shaft compartment 2n of the axle housing while the left-hand end of shaft 15 is supported in a bearing 15a of the other wheel-shaft compartment 2p.

The differential 14 may be a conventional automotive- vehicle differential in which the same gears are provided on shafts 15 and 16 and the planetary gear shafts are rotatably mounted upon the cage carrying the gear 13. A differential of this type is described in PRINCIPLES OF AUTOMOTIVE VEHICLES, U.S. GOVERNMENT Printing Office, 1956, page 344. However, I prefer to use a non-spin differential (limited slip) as described in pages 345 – 347 of this publication or a controlled differential in which the differential may be locked by the vehicle operator (see pages 347 – 349), as represented by the dot-dash line 31.

Each of the shafts 15 and 16 is provided with a locking brake generally indicated at 20 for restricting rotation of the corresponding wheel when, for example, a parking-brake arrangement is employed. By selective control of these brakes, however, slippage of one of the wheels may be prevented even with an ordinary differential to apply torque at the other wheel. The brakes include actuating levers 21 which operate bands 21a engageable with the brake drums 20. Suitable band-type brakes are described at pages 8 – 53 ff of MARKS MECHANICAL ENGINEERS' HANDBOOK, McGraw-Hill Book Company, New York, 1958.

Each of the shafts 15, 16 carries within the respective compartment 2n, 2p, a pinion gear 17 of a step-down transmission 17, 18, referred to earlier as an aftertransmission. The driven shaft 18 of each of these aftertransmissions is mounted upon the wheel drive shaft 18a, at the respective end of the axle housing 2 carrying, at its outer extremity, the wheel hub 19. Rubber-tired wheels of any other wheel structure may be mounted on the hub by conventional means. Each of the wheel-driven shafts 18a, 18b is journaled between a pair of bearings 2q and 2r parallel to the shafts 15, 16 and to the motor output shaft 11, but perpendicular to the axes A and B and to the shafts 1 and 5. The pump 6 is oriented to lie in line with the axis 11 and, advantageously, the axes of shafts 11 and 5 intersect within the body of the pump 6.

The operation of the transmission illustrated in the drawing needs no elucidation except, of course, to mention that an auxiliary pump 22 may be mounted within the axle housing and coupled via a gear 23 to the drive gear 3 of the pretransmission 3, 4 and the main drive shaft 1. The engine torque is applied through the main drive shaft and power takeoff is available at the angular velocity of the main drive shaft 1 via the free extremity 1b projecting from the rear end of the axle housing or provided adjacent the rear wall thereof. Operation of auxiliary equipment is, of course, permitted at different speeds at 7a and 22, the speeds being determined by the transmission ratios of gears 3, 4 in the first case and gear 3, 23 in the latter, the transmission 3, 4 drives the hydrostatic pump which, together with the hydrostatic motor 9 forms an infinitely adjustable variable speed couple, the pump 6, moreover, being operated at the most economical rate by virtue of the pretransmission. Finally the wheels are driven via the aftertransmissions 12, 13 and/or 17, 18 which permit the hydrostatic motor 9 to operate at the optimum rate.

The improvement described and illustrated is believed to admit of many modifications within the ability of persons skilled in the art, all such modifications being considered within the spirit and scope of the invention except as limited by the appended claims.

I claim:

1. A hydraulic transmission system for an automotive vehicle having a pair of axially aligned driving wheels, said system comprising:

an elongated axle housing extending transversely to the direction of movement of the vehicle;

a pair of wheel shafts journaled in said housing at opposite ends thereof and respectively carrying said wheels, said shafts being perpendicular to the direction of displacement of the vehicle;

a main drive shaft journaled on and extending into said housing, generally perpendicularly to said wheel shafts and connectable with a source of motive power;

a hydraulic couple within said housing and including a hydraulic pump having a pump-drive shaft generally parallel to said main drive shaft, said main drive shaft extending from said housing for connection to a load, and a hydraulic motor in fluid communication with said hydraulic pump and having an output shaft extending parallel to said wheel shafts;

a first fixed-ratio mechanical transmission including meshing first gears disposed within said axle housing and operatively connecting said main drive shaft with said pump-drive shaft in said housing, and at least one second fixed-ratio mechanical transmission including meshing second gears disposed within said housing connecting said output shaft with said wheel shafts within said housing; and means for adjusting said hydraulic couple for varying the transmission ratio between said pump-drive shaft and said output shaft.

2. The hydraulic transmission system defined in claim 1 wherein said first fixed-ratio mechanical transmission includes a driving gear mounted upon said main drive shaft and a driven gear mounted upon said pump drive shaft and meshing with said driving gear.

3. The hydraulic-transmission system defined in claim 2 wherein said second fixed-ratio mechanical transmission includes:

a differential having a planetary gear cage and a pair of differential output shafts extending parallel to the motor output shaft and said wheel shafts but offset therefrom;

a first pair of meshing gears interconnecting said motor output shaft with said cage for driving the latter; and further pairs of meshing gears interconnecting each of said differential output shafts with a respective one of said wheel shafts.

4. The hydraulic-transmission system defined in claim 3, further comprising means including another gear meshing with said driving gear for operating an auxiliary device.

5. The hydraulic transmission defined in claim 3 wherein said main drive shaft is provided with a free end connectable to an auxiliary device.

6. The hydraulic transmission defined in claim 5 wherein said free end of said main drive shaft extends outwardly from said housing.

7. The hydraulic transmission defined in claim 3, further comprising respective brakes on each of said differential output shafts for selectively locking same.

8. The hydraulic transmission defined in claim 3 wherein said differential is of the controlled type.

9. The hydraulic transmission defined in claim 3 wherein said pump drive shaft and said output shaft of said motor have axes interconnecting within the body of said pump.

10. The hydraulic transmission defined in claim 9 wherein said pump is a hydrostatic pump and said motor is a hydrostatic motor articulated for joint movement with said pump.

* * * * *